United States Patent
Li

(10) Patent No.: US 8,582,912 B2
(45) Date of Patent: Nov. 12, 2013

(54) SYSTEMS AND METHODS FOR CALCULATING IMAGE SHARPNESS MEASUREMENTS

(75) Inventor: Huai Dong Li, Cupertino, CA (US)

(73) Assignee: Aptina Imaging Corporation, George Town (KY)

( * ) Notice: Subject to any disclaimer, the term of this patent is extended or adjusted under 35 U.S.C. 154(b) by 288 days.

(21) Appl. No.: 13/081,939

(22) Filed: Apr. 7, 2011

(65) Prior Publication Data

US 2012/0189225 A1 Jul. 26, 2012

Related U.S. Application Data

(60) Provisional application No. 61/436,522, filed on Jan. 26, 2011.

(51) Int. Cl.
*G06K 9/40* (2006.01)

(52) U.S. Cl.
USPC ............... 382/260; 382/263; 382/264

(58) Field of Classification Search
USPC .......... 382/260–266, 272, 274; 348/630, 678, 348/E9.042
See application file for complete search history.

(56) References Cited

U.S. PATENT DOCUMENTS

| | | | |
|---|---|---|---|
| 4,951,073 A | 8/1990 | Slavitter | |
| 6,201,582 B1 * | 3/2001 | Hentschel | 348/607 |
| 6,317,166 B1 | 11/2001 | McCutchen | |
| 6,340,991 B1 | 1/2002 | Chen | |
| 7,057,663 B1 | 6/2006 | Lee | |
| 7,356,195 B2 * | 4/2008 | Shaked et al. | 382/260 |
| 7,860,332 B2 * | 12/2010 | Lim et al. | 382/255 |
| 7,949,198 B2 * | 5/2011 | Olson | 382/260 |
| 8,294,781 B2 * | 10/2012 | Cote et al. | 348/222.1 |
| 8,351,735 B2 * | 1/2013 | Biezen et al. | 382/274 |
| 2003/0151681 A1 * | 8/2003 | Miyahara | 348/234 |
| 2005/0244074 A1 * | 11/2005 | Shaked et al. | 382/260 |
| 2007/0154107 A1 * | 7/2007 | Jang | 382/266 |
| 2007/0223834 A1 * | 9/2007 | Lertrattanapanich et al. | 382/263 |

OTHER PUBLICATIONS

D. Shaked and I. Tastl, "Sharpness measure: Towards automatic image enhancement," in Proc. IEEE Int. Conf. Image Processing, Sep. 2005, vol. 1, pp. 937-940.*
C. Vu, T. Phan, and D. Chandler, "S3: A spectral and spatial measure of local perceived sharpness in natural images," Image Processing, IEEE Transactions on, vol. 21, No. 3, 2011.*
R. Ferzli and L.J. Karam, "A no-reference objective image sharpness metric based on the notion of just noticeable blur (jnb)," IEEE Transactions on Image Processing, vol. 18, No. 4, pp. 717-728, 2009.*
Fisher et al, Unsharp Filter, http://homepages.inf.ed.ac.uk/rbf/HIPR2/unsharp.htm, May 2004.*

* cited by examiner

*Primary Examiner* — Andrae S Allison
(74) *Attorney, Agent, or Firm* — Treyz Law Group; Chih-Yun Wu; Michael H. Lyons

(57) ABSTRACT

Imaging systems with image sensors and image processing circuitry are provided. The image processing circuitry may calculate sharpness values for a window within an image captured by the image sensors. The window may be divided into zones. A first filter may be applied to each row of each zone. A first sharpness value may be calculated by averaging the absolute values of the outputs of the first filter that are greater than a first threshold. A second sharpness value may be calculated by averaging the absolute values of the outputs of the second filter that are greater than a second threshold. A final sharpness value for each zone may be calculated by dividing the second sharpness value by the first sharpness value and multiplying the result by corresponding scalar weights. A window sharpness value may be calculated from the weighted sum of the final sharpness values of each zone.

16 Claims, 5 Drawing Sheets

SYSTEMS AND METHODS FOR CALCULATING IMAGE SHARPNESS MEASUREMENTS

This application claims the benefit of provisional patent application No. 61/436,522, filed Jan. 26, 2011, which is hereby incorporated by reference herein in its entirety.

BACKGROUND

This relates generally to imaging systems, and more particularly to imaging systems performing sharpness measurements.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals. Imaging systems may require pre-processing and post-processing of images captured by the receipt and conversion of light into electrical signals. Imaging systems may contain image processing circuitry that provides pre-processing and post-processing functionality such as auto focus mechanisms and adaptive image enhancement. During pre-processing and post-processing functions, imaging systems may perform sharpness measurements on desired portions of captured images.

In low light conditions, conventional imaging systems suffer from increased noise, and sharpness measurements performed by the system may be degraded.

Therefore, it would be desirable to design an imaging system with improved sharpness measurements.

DETAILED DESCRIPTION

Embodiments of the present invention relate to imaging systems with image processing circuitry. Image processing circuitry may be used to calculate image sharpness measurements. The calculated image sharpness measurements may be used to determine auto-focus settings and adaptive image enhancement settings. For example, the image sharpness measurements for various sections of an image may be used to determine the focus point of a captured image.

Figure 1:
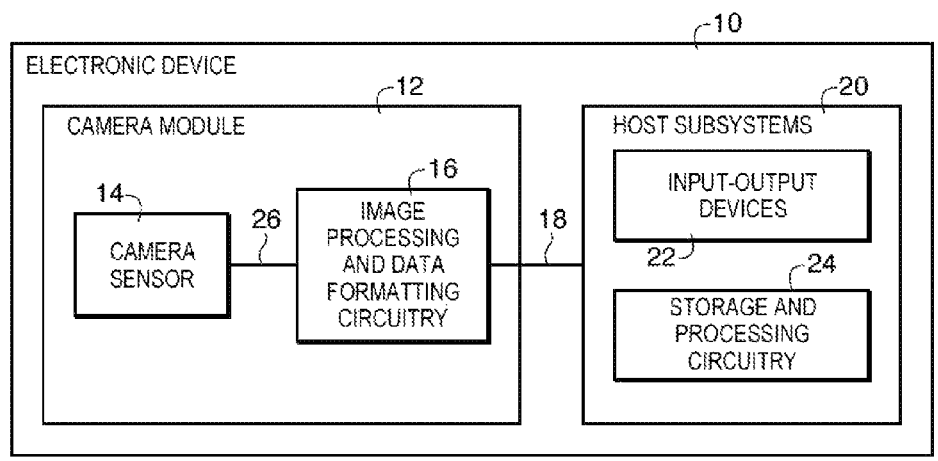
FIG. 1 is a schematic diagram of an electronic device that may include a camera module and image processing circuitry in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels). As examples, image sensor 14 may include bias circuitry (e.g., source follower load circuits), sample and hold circuitry, correlated double sampling (CDS) circuitry, amplifier circuitry, analog-to-digital (ADC) converter circuitry, data output circuitry, memory (e.g., buffer circuitry), address circuitry, etc.

Still and video image data from camera sensor 14 may be provided to image processing and data formatting circuitry 16 via path 26. Image processing and data formatting circuitry 16 may be used to perform image processing functions such as data formatting, adjusting white balance and exposure, implementing video image stabilization, face detection, auto focus, adaptive image sharpening, etc. In a typical arrangement, which is sometimes referred to as a system on chip or SOC arrangement, camera sensor 14 and image processing and data formatting circuitry 16 are implemented on a common integrated circuit. The use of a single integrated circuit to implement camera sensor 14 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Figure 2:
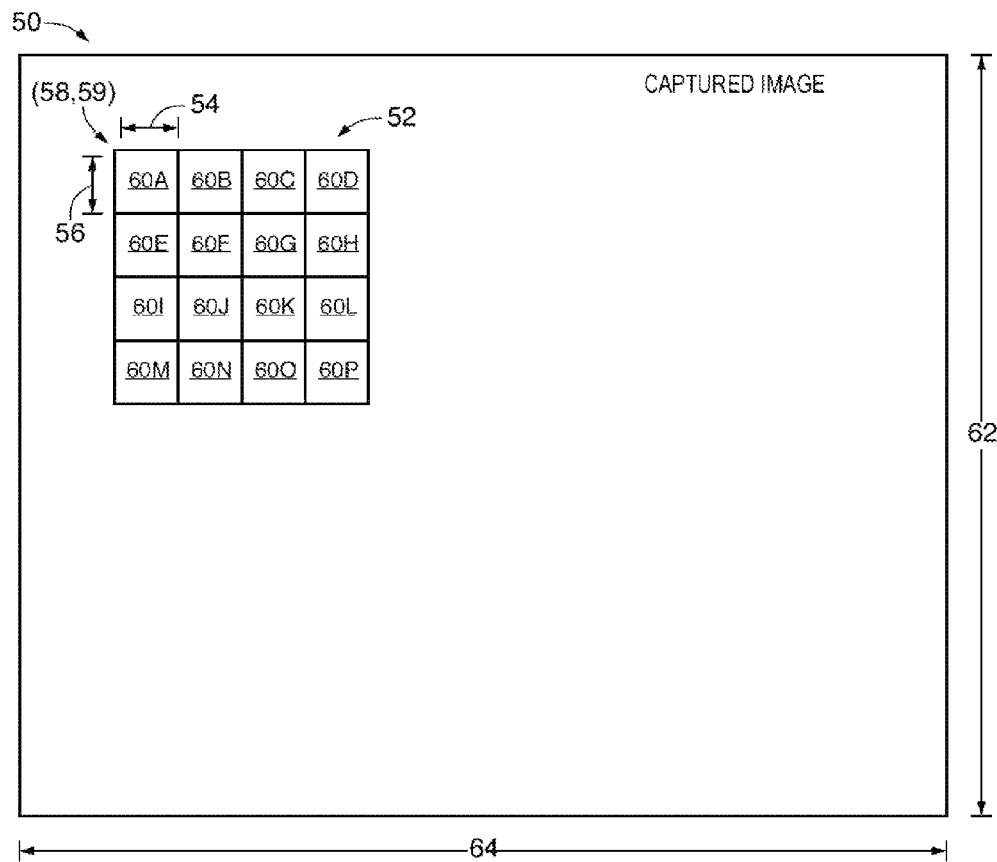
FIG. 2 is a schematic diagram of an illustrative captured image with an image window that may be used in measuring the sharpness of the captured image in accordance with an embodiment of the present invention.

Camera sensor 14 may be configured to capture an image and send the captured image to image processing circuitry 16 over path 26. FIG. 2 shows a captured image 50 with width 64 and height 62 received by image processing circuitry 16 from camera sensor 14. Window 52 may be located at pixel coordinates (58, 59) in captured image 50. Pixel coordinates (58, 59) may represent the location of window 52 within captured image 50. Window 52 may be divided into rectangular sub-blocks 60. Sub-blocks 60 may sometimes be referred to herein as zones. Zones 60 may have a height 56 and a width 54. Zones 60 may partition window 52 into equally sized portions, as one example. Window 52 may be an area of interest in captured image 50 in which it is desirable to calculate a sharpness measurement. Image processing circuitry 16 may be configured to calculate a window sharpness measurement for a window such as window 52.

Figure 3:
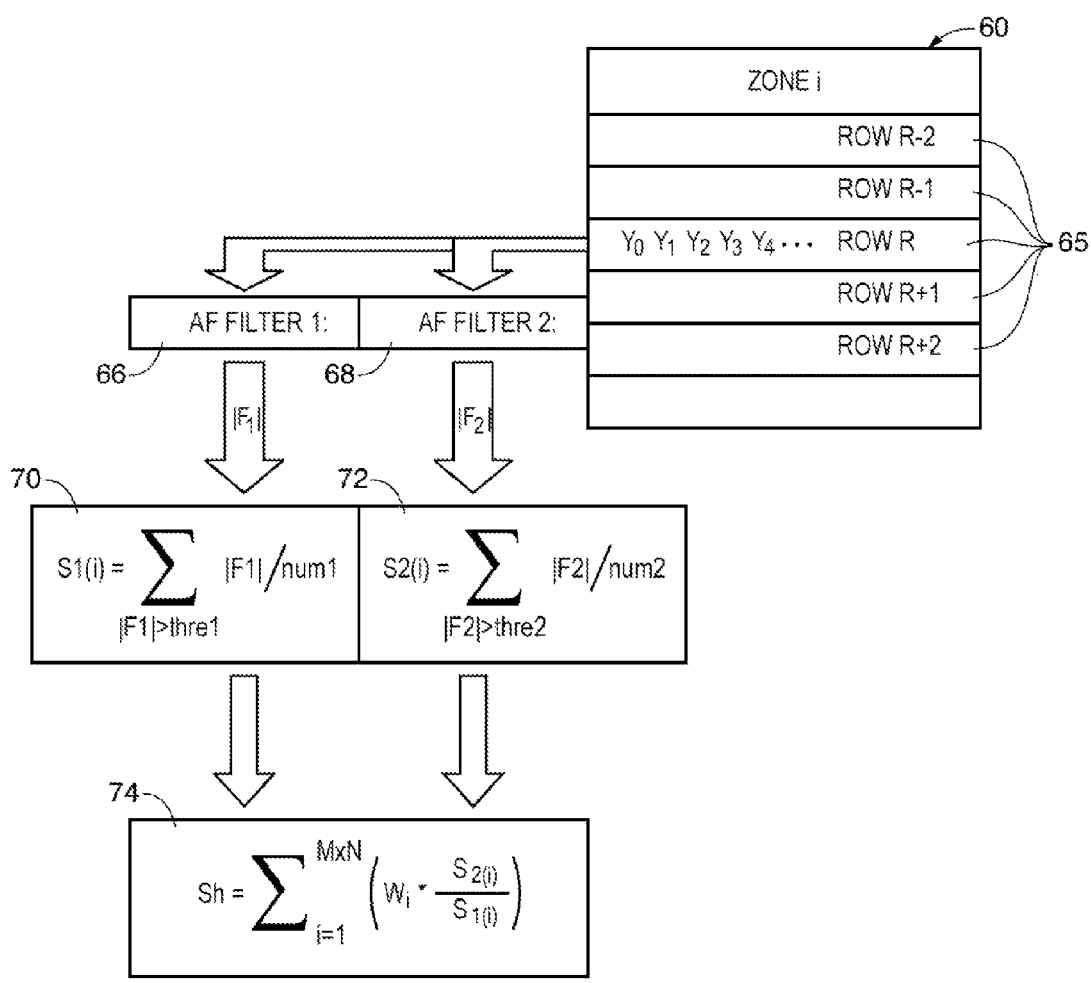
FIG. 3 is a flow chart of illustrative mathematical processes that may be used in calculating the sharpness of a captured image in accordance with an embodiment of the present invention

The flow chart in FIG. 3 illustrates mathematical processes that may be used to calculate a sharpness measurement for window 52.

For each zone 60 (sub-block) of window 52, AF Filter 1 (filter 66) and AF Filter 2 (filter 68) may be applied to each row of the zone.

Filter 66 may be a one dimensional (1-D) finite impulse response (FIR) filter. Finite impulse response filter 66 may take as an input a group of pixels in a selected row in zone 60. Finite impulse response filter 66 may generate a single output from the group of pixels in a selected row in zone 60 used as an input. The number of pixels used by impulse response filter 66 to generate a single output may be referred to as the tap number of finite impulse response filter 66 (e.g., an impulse response filter 66 that generates a single output from a group of five pixels may have a tap number five). Filter 66 may have coefficients corresponding to each pixel of the input group of pixels of filter 66. For example, a finite impulse response filter 66 with tap number equal to 5 may have five coefficients corresponding to the five input pixels of the filter. The output of finite impulse response filter 66 may be the sum of each of the input pixels scaled by the corresponding coefficient for that input pixel. A finite impulse response filter 66 with tap number equal to five and coefficients (−1, −2, 3, 2, 1) applied to index j of an image pixel with pixel data Y(j−2), Y(j−1), Y(j), Y(j+1), and Y(J+2) will have an output −1*Y(j−2)−2*Y(j−1)+3*Y(j)+2*Y(j+1)+1*Y(j+2) (as an example). The coefficients of FIR filter 66 may be chosen to give FIR filter 66 band pass characteristics. The coefficients of FIR filter 66 may also be chosen to give FIR filter 66 low pass characteristics, if desired. For example, an FIR filter 66 with tap number equal to 5 and coefficients (0.2, 0.2, 0.2, 0.2, 0.2) may have low pass characteristics (e.g., the FIR filter 66 may perform an averaging of the group of input pixels).

During the operations of step 70, absolute values may be taken of each of the outputs F1 from filter 66 (e.g., |F1|). The absolute values |F1| that have an absolute value greater than a first threshold (thre1) may be added to a first sum for zone i (e.g., the first sum may be the sum of absolute values |F1| for each row in zone 60 that are greater than the first threshold thre1). A first sharpness score may be calculated by dividing the first sum by the total number of absolute values |F1| that have an absolute value greater than the first threshold thre1 (e.g., the first sharpness score may be the average of the absolute values |F1| that have an absolute value greater than the first threshold thre1).

Filter 68 may be a one dimensional (1-D) high pass FIR filter. Filter 68 may also be a band pass FIR filter, if desired. The coefficients of FIR filter 68 may be chosen to give FIR filter 66 high pass characteristics. The coefficients of FIR filter 66 may also be chosen to give FIR filter 68 band pass characteristics, if desired.

During the operations of step 72, absolute values may be taken of each of the outputs F2 from filter 68 (e.g., |F2|). The absolute values |F2| that have an absolute value greater than a second threshold thre2 may be added to a second sum for zone i (e.g., the second sum may be the sum of absolute values |F2| greater than the second threshold thre2). A second sharpness score may be calculated by dividing the second sum by the total number of absolute values |F2| that have an absolute value greater than the second threshold thre2 (e.g., the second sharpness score may be the average of the absolute values |F2| that have an absolute value greater than the second threshold thre2).

Thresholds thre1 and thre2 may be adaptively chosen to overcome the effect of increasing noise level when capturing images in low light conditions. For example, as the amount of light in a scene decreases, thresholds thre1 and thre2 may be increased to compensate for the decreasing light (e.g., to compensate for increasing low light noise levels). Adaptively choosing thresholds thre1 and thre2 to compensate for low light conditions may improve the accuracy of the sharpness scores. Thresholds thre1 and thre2 may be adaptively chosen from noise models for camera sensor 14. Noise models for camera sensor 14 may predict the standard deviation of noise of camera sensor 14 for a given captured image. For example, noise models for camera sensor 14 may predict a noise standard deviation σ for camera sensor 14. Threshold thre1 may be determined from noise standard deviation σ multiplied by a scalar k1. Scalar k1 may be empirically determined to maximize accuracy of the first sharpness score in specific low light conditions. Threshold thre2 may be determined from noise standard deviation σ multiplied by a scalar k2. Scalar k2 may be empirically determined to maximize accuracy of the second sharpness score in specific low light conditions. Scalar k1 and scalar k2 may have values between 2 and 6 (as examples).

During the operations of step 74, a final sharpness score for zone i may be calculated from the division of the second sharpness score (e.g., the sharpness score calculated from the output of band pass FIR filter 68) by the first sharpness score (e.g., the sharpness score calculated from the output of high pass FIR filter 66), multiplied by a weight Wi associated with zone i. The division of the second sharpness score by the first sharpness score (i.e., the ratio between the second sharpness and first sharpness score) may provide increased accuracy across final sharpness scores for varying zones. For example, zones with increased brightness and contrast may have increased first and second sharpness scores that do not reflect an actual increase in sharpness of that zone. The division of the second sharpness score by the first sharpness score may reduce the undesired increase in final sharpness score resulting from increased brightness and contrast. A window sharpness score Sh may be calculated from the summation of each of the final sharpness scores for each zone scaled by corresponding weights Wi. The weights Wi for each zone may be chosen to give certain zones 60 in window 52 more weight in window sharpness score Sh. For example, during an autofocus procedure, sharpness scores may be desired for only some of zones 60. In this case, the weights Wi for more-desired zones may be given higher values than the weights Wi for less-desired zones.

FIG. 3 is merely an illustrative example. In general, filters 66 and 68 may be one dimensional finite impulse response filters, two dimensional finite impulse response filters, or any filters suitable for filtering image pixels.

Figure 4:
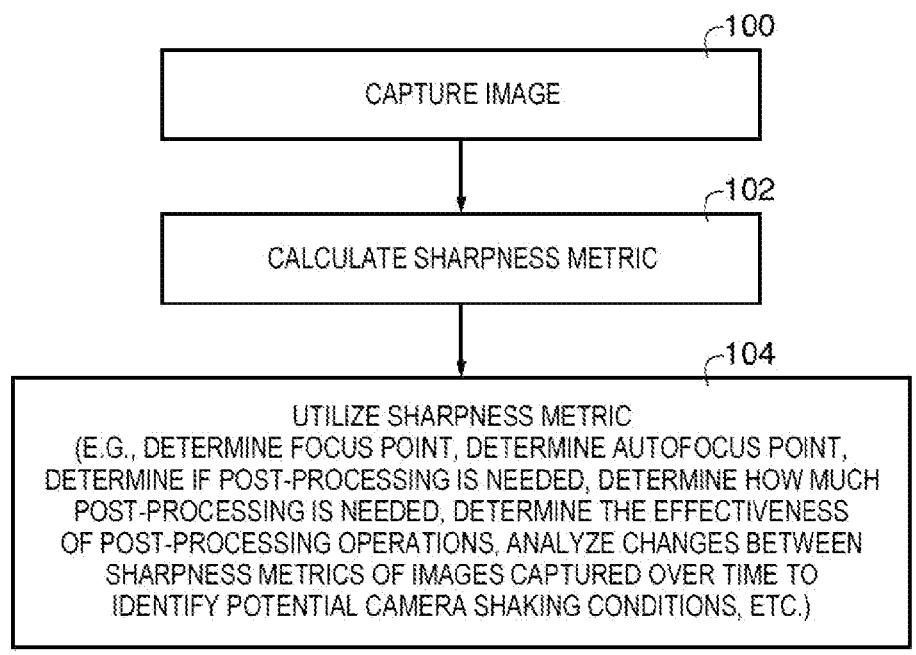
FIG. 4 is a flow chart of illustrative processes that may be used in calculating and utilizing a sharpness measurement in accordance with an embodiment of the present invention.

The diagram of FIG. 4 illustrates how a sharpness measurement may be calculated and used during an image capture process in electronic device 10. During the operations of step 100, an image may be captured by camera sensor 14 and sent to image processing circuitry 16 over path 26. During the operations of step 102, a sharpness metric may be calculated by image processing circuitry 16 from the image captured in step 100. During the operations of step 104, the sharpness metric calculated in step 102 may be used to assist in image processing. The sharpness metric may be used to assist in image pre-processing such as determining the autofocus point during an autofocus procedure and identifying camera shaking conditions. The sharpness metric may also be used to assist in image post-processing such as identifying the necessity of image post-processing, identifying the amount of image post-processing needed, and identifying the effectiveness of post-processing operations.

Figure 5:
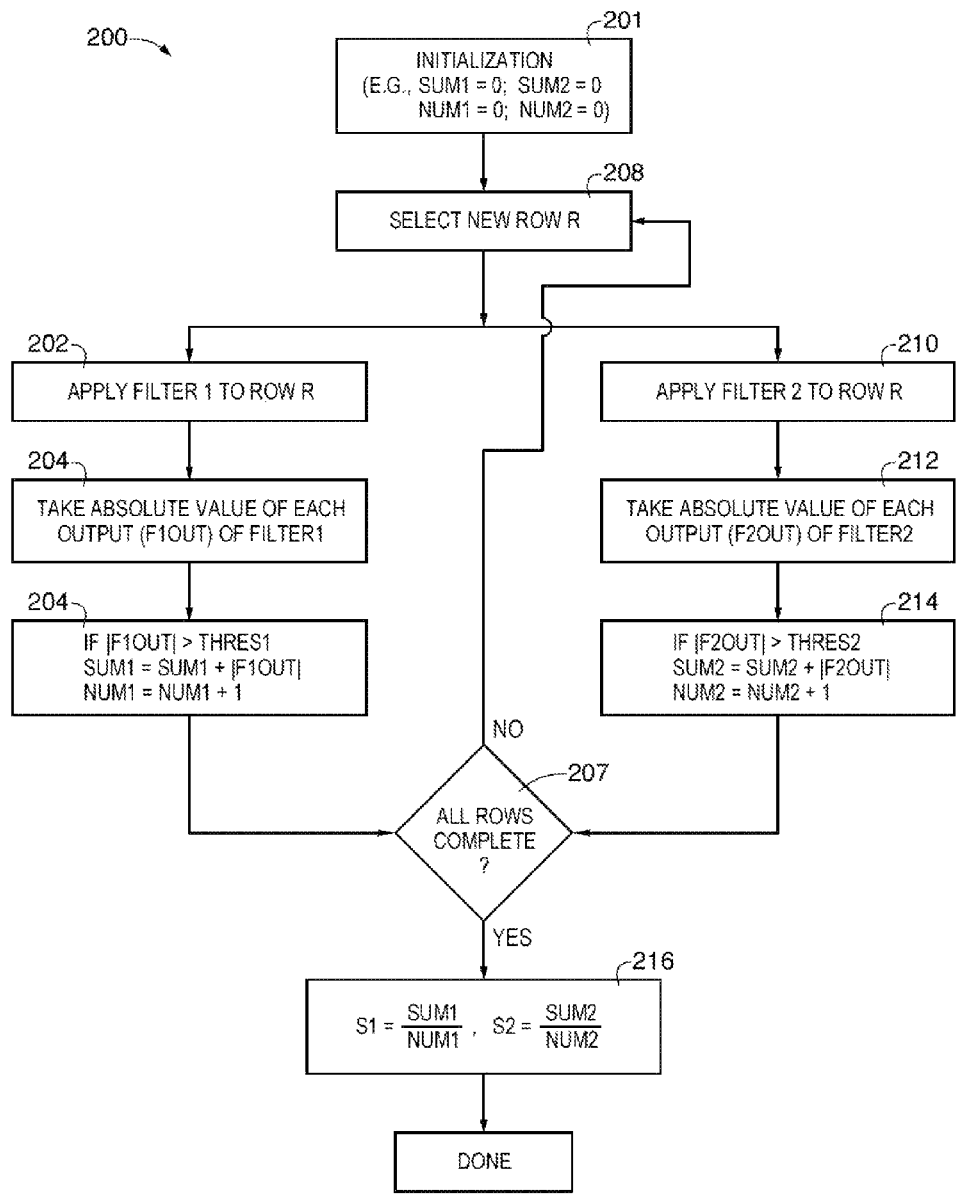
FIG. 5 is a flow chart of illustrative processes that may be used in calculating a sharpness measurement for a window of a captured image in accordance with an embodiment of the present invention.

Flow chart 200 of FIG. 5 illustrates a process of calculating a first and second sharpness score for a selected zone 60 of window 52.

During the operations of step 201, initialization procedures may be performed (e.g., by setting a first sum (SUM1) to zero, setting a second sum (SUM2) to zero, setting a first count (NUM1) to zero, and setting a second count (NUM2) to zero).

During the operations of step 208, a new row R may be selected from the rows of the selected zone of window 52.

During the operations of step 202, a filter 1 may be applied to the selected row R (e.g., F1OUT=F1(R)). Filter 1 may be a band pass finite impulse response (FIR) filter, a low pass finite impulse response (FIR) filter, or any filter suitable for filtering image pixels. If rows remain in the zone that have not been processed by step 202, row R is updated to the next remaining row in the zone during the operations of step 208.

During the operations of step 204, the absolute value of the output of filter 1 may be taken (e.g., ABS(F1OUT).

During the operations of step 206, if the absolute value of the output of filter 1 is greater than a first threshold (e.g., if ABS(F1OUT)>THRES1), the absolute value of the output of filter 1 may be added to the first sum (e.g., SUM1=SUM1+ABS(F1OUT) and the first count may be incremented by one (e.g., NUM1=NUM1+1).

During the operations of step 210, a filter 2 may be applied to the selected row R (e.g., F2OUT=F2(R)). Filter 2 may be a high pass finite impulse response (FIR) filter, a band pass finite impulse response (FIR) filter, or any filter suitable for filtering image pixels. If rows remain in the zone that have not been processed by steps 210, row R may be updated to the next remaining row in the zone during the operations of step 208.

During the operations of step 212, the absolute value of the output of filter 2 may be taken (e.g., ABS(F2OUT)).

During the operations of step 214, if the absolute value of the output of filter 2 is greater than a second threshold (e.g., if ABS(F2OUT)>THRES2), the absolute value of the output of filter 2 may be added to the second sum (e.g., SUM2=SUM2+ABS(F2OUT) and the second count may be incremented by one (e.g., NUM2=NUM2+1).

Steps 210, 212, and 214 may be processed concurrently with steps 202, 204, 206, if desired.

During the operations of step 207, if all rows of zone 60 have been processed by filter 1 and filter 2, the operations of step 216 are performed. If rows remain that have not been processed by filter 1 and filter 2, the operations of step 208, and subsequent steps 202, 204, 206, 210, 212, and 214, may be repeated.

During the operations of step 216, a first sharpness score may be calculated from the ratio of the first sum and the first count (e.g., S1=SUM1/NUM1) and a second sharpness score may be calculated from the ratio of the second sum and the second count (e.g., S2=SUM2/NUM2). The first sharpness score may be the average of the absolute values of the outputs of FILTER 1 that have an absolute value greater than the first threshold. The second sharpness score may be the average of the absolute values of the outputs of FILTER 2 that have an absolute value greater than the second threshold.

Figure 6:
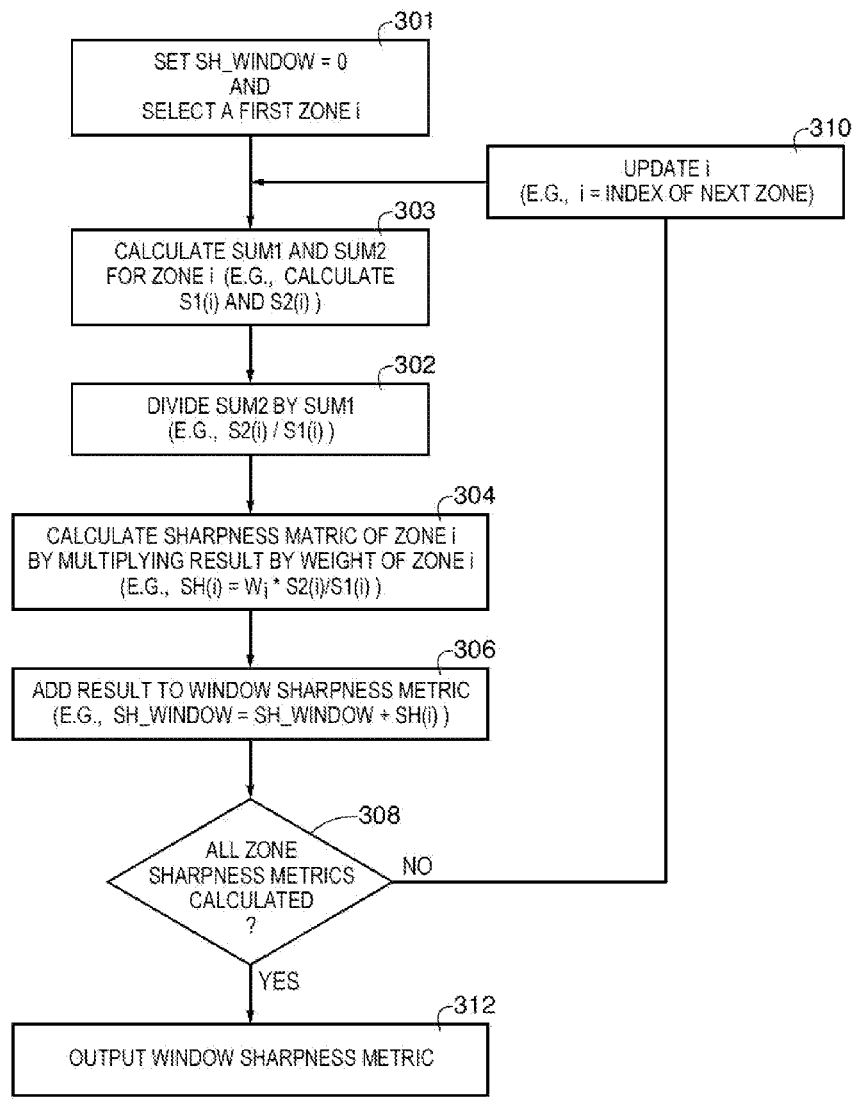
FIG. 6 is a flowchart of illustrative processes that may be used in calculating a sharpness measurement for a window of a captured image in accordance with an embodiment of the present invention.

The flowchart of FIG. 6 illustrates how a window sharpness score SH_WINDOW for window 52 may be calculated from zones 60A-60P of window 52 of FIG. 2.

During the operations of step 301, window sharpness score SH_WINDOW may be initialized to zero and a first zone i may be selected from zones 60A-60P of window 52.

Step 303 of FIG. 6 may be equivalent to the steps of flow chart 200 in FIG. 5. During the operations of step 303, a first sharpness score corresponding to a first filter F1 and a second sharpness score corresponding to a second filter F2 may be calculated for zone i.

During the operations of step 302, the second sharpness score may be divided by the first sharpness score (e.g., S2(i)/S1(i)).

During the operations of step 304, a final sharpness score for zone i may be calculated from the result of step 302 multiplied by a weight Wi associated with zone i (e.g., SH(i)=Wi*S2(i)/S1(i)).

During the operations of step 306, the result of step 304 may be added to window sharpness metric SH_WINDOW (e.g., SH_WINDOW=SH_WINDOW+SH(i)).

During the operations of step 308, it may be determined if any of the zones of zones 60A-60P have not been processed during steps 303 and steps 302-306. If there are zones that have not been processed zone i may be updated to the next zone in step 310 and the process may return to step 303. If all of the zones have been processed, a final window sharpness metric SH_WINDOW may be output by image processing circuitry 16 in step 312.

Various embodiments have been described illustrating systems and methods for calculating image sharpness.

Imaging systems may include image sensor arrays for capturing images and may include image processing circuitry. The image processing circuitry may perform functionality such as determining focus points, determining autofocus points, and adaptive image sharpening. Said functionality may utilize sharpness measurements of portions (windows) within captured images.

A window within a captured image may be divided into rectangular zones (e.g., sub-blocks). A first finite impulse response filter may be applied to each row of each zone. Absolute values may be taken of each output of the first finite impulse response filter. The first finite impulse response filter may be a band-pass filter, low-pass filter, or any filter suitable for filtering image pixels. A first sharpness value for each zone may be calculated by averaging the absolute values of the outputs of the first finite impulse response filter that have a value greater than a first threshold for that zone. A second finite impulse response filter may be applied to each row of each zone. Absolute values may be taken of each output of the second finite impulse response filter. The second finite impulse response filter may be a high-pass filter, band-pass filter, or any filter suitable for filtering image pixels. A second sharpness value for each zone may be calculated by averaging the absolute values of the outputs of the second finite impulse response filter that have a value greater than a second threshold for that zone. A final sharpness value for each zone may be calculated by dividing the second sharpness value for each zone by the first sharpness value for each zone and multiplying the result by a scalar weight corresponding to each zone. The scalar weights for each zone may be chosen to give more weight to specific zones of the window in the calculation of the final sharpness value. The division of the second sharpness value by the first sharpness value may provide increased accuracy of the final sharpness value across zones. A window sharpness value may be calculated from the sum of the final sharpness values of each zone.

The foregoing is merely illustrative of the principles of this invention which can be practiced in other embodiments.

What is claimed:

1. A method of calculating sharpness of an image using image processing circuitry, the method comprising:

using the image processing circuitry, calculating a first sharpness value by applying a first filter to pixels in the image;

using the image processing circuitry, calculating a second sharpness value by applying a second filter to the pixels; and using the image processing circuitry, calculating a third
sharpness value based on a ratio of the first and second
sharpness values, wherein calculating the first sharpness
value comprises:
- calculating a set of values by applying the first filter to the pixels;
- calculating a number corresponding to how many of the set of values exceed a threshold value; and
- summing the set of values that exceed the threshold value and dividing the sum of the values that exceed the threshold value by the number.

2. The method defined in claim 1, wherein the first filter comprises a low pass filter.

3. The method defined in claim 1, wherein the first filter comprises a band pass filter.

4. The method defined in claim 1, wherein the first filter comprises a first finite impulse response filter and wherein the second filter comprises a second finite impulse response filter.

5. The method defined in claim 4, wherein the first finite impulse response filter comprises a band pass finite impulse response filter and the second finite impulse response filter comprises a high pass finite impulse response filter.

6. The method defined in claim 1, wherein the second filter comprises a high pass filter.

7. The method defined in claim 1, wherein the second filter comprises a band pass filter.

8. A method of calculating sharpness of an image using image processing circuitry, the method comprising:
- using the image processing circuitry, calculating a first sharpness value by applying a first filter to pixels in the image;
- using the image processing circuitry, calculating a second sharpness value by applying a second filter to the pixels; and
- using the image processing circuitry, calculating a third sharpness value based on a ratio of the first and second sharpness values, wherein calculating the third sharpness value comprises:
  - with the image processing circuitry, calculating the third sharpness value by multiplying the ratio by a scalar associated with the pixels.

9. A method of calculating sharpness of an image using image processing circuitry, the method comprising:
- using the image processing circuitry, calculating a first sharpness value by applying a first filter to pixels in the image;
- using the image processing circuitry, calculating a second sharpness value by applying a second filter to the pixels;
- using the image processing circuitry, calculating a third sharpness value based on a ratio of the first and second sharpness values, wherein calculating the first sharpness value by applying the first filter to the pixels in the image comprises:
  - calculating a set of values by applying the first filter to the pixels; and
  - calculating the first sharpness value by summing the set of values that exceed a threshold value, wherein the set of values comprises a first set of values, wherein the threshold value comprises a first threshold value, wherein calculating the second sharpness value by applying the second filter to the pixels in the image comprises:
    - calculating a second set of values by applying the second filter to the pixels; and
    - calculating the second sharpness value by summing the second set of values that exceed a second threshold value; and
- using the image processing circuitry, calculating a first number corresponding to how many of the first set of values exceed the first threshold value, wherein calculating the first sharpness value comprises summing the first set of values that exceed the first threshold value and dividing the sum of the first values that exceed the first threshold value by the first number.

10. The method defined in claim 9 further comprising:
using the image processing circuitry, calculating a second number corresponding to how many of the second set of values exceed the second threshold value, wherein calculating the second sharpness value comprises summing the second set of values that exceed the second threshold value and dividing the sum of the values that exceed the second threshold value by the second number.

11. The method defined in claim 10 wherein the first threshold value is equal to the second threshold value.

12. The method defined in claim 10 wherein the first threshold value is greater than the second threshold value.

13. The method defined in claim 10 wherein the first threshold value is less than the second threshold value.

14. The method defined in claim 10 wherein each of the first set of values is associated with a respective one of the pixels in the image, wherein applying the first filter to the pixels comprises:
with the image processing circuitry, iteratively applying the first filter to each of the pixels in the image, wherein applying the first filter to a given one of the pixels comprises calculating a weighted summation of that given pixel and at least two pixels adjacent to that pixel.

15. The method defined in claim 14 wherein each of the second set of values is associated with a respective one of the pixels in the image, wherein applying the second filter to the pixels comprises:
with the image processing circuitry, iteratively applying the second filter to each of the pixels in the image, wherein applying the second filter to a given one of the pixels comprises calculating a weighted summation of that given pixel and at least two pixels adjacent to that pixel.

16. The method defined in claim 10 further comprising:
with a noise model, adaptively calculating the first threshold value and the second threshold value.

* * * * *